United States Patent
Blackmore et al.

(10) Patent No.: US 7,231,638 B2
(45) Date of Patent: *Jun. 12, 2007

(54) MEMORY SHARING IN A DISTRIBUTED DATA PROCESSING SYSTEM USING MODIFIED ADDRESS SPACE TO CREATE EXTENDED ADDRESS SPACE FOR COPYING DATA

(75) Inventors: Robert S. Blackmore, Poughkeepsie, NY (US); Amy Xin Chen, Poughkeepsie, NY (US); Rama K. Govindaraju, Hopewell Junction, NY (US); Chulho Kim, Poughkeepsie, NY (US); Hanhong Xue, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 854 days.

This patent is subject to a terminal disclaimer.

(21) Appl. No.: 10/308,734

(22) Filed: Dec. 3, 2002

(65) Prior Publication Data

US 2004/0107419 A1    Jun. 3, 2004

(51) Int. Cl.
*G06F 15/167* (2006.01)
*G06F 12/00* (2006.01)
*G06F 12/06* (2006.01)

(52) U.S. Cl. .............. 718/108; 709/212; 709/216; 711/2

(58) Field of Classification Search ............. 718/100; 709/229
See application file for complete search history.

(56) References Cited

U.S. PATENT DOCUMENTS

| | | | |
|---|---|---|---|
| 4,685,125 A | 8/1987 | Zave | |
| 5,325,526 A | 6/1994 | Cameron et al. | |
| 5,463,770 A | 10/1995 | Todd | |
| 5,542,047 A | 7/1996 | Armstrong | |
| 5,617,537 A * | 4/1997 | Yamada et al. | 709/214 |
| 5,692,192 A | 11/1997 | Sudo | |
| 5,701,482 A | 12/1997 | Harrison et al. | |
| 5,771,383 A * | 6/1998 | Magee et al. | 719/312 |
| 6,009,264 A | 12/1999 | Merritt et al. | |
| 6,035,335 A | 3/2000 | Franke et al. | |
| 6,038,604 A | 3/2000 | Bender et al. | |
| 6,092,098 A | 7/2000 | Araki et al. | |

(Continued)

OTHER PUBLICATIONS

Pending Patent Application incorporated by reference, Bashkansky et al. "Data Gather/Scatter Machine," U.S. Appl. No. 09/517,167, filed Mar. 2, 2000; assignee: International Business Machines,(PO999129).

*Primary Examiner*—Meng-Al T. An
*Assistant Examiner*—Eric C Wai
(74) *Attorney, Agent, or Firm*—Lawrence D. Cutter, Esq.; Kevin P. Radigan, Esq.; Heslin Rothenberg Farley & Mesiti, P.C.

(57) ABSTRACT

A method is provided for sharing and/or transporting data within a single node of a multi-node data processing. The method avoids the necessity of making more than one copy of the data to be shared or transported. The method is tunable based on the size of the data segment involved. A shared memory area between tasks running in different address spaces on the node is used to coordinate the process and for task to task communication. The increase in efficiency provided by the intranodal process described herein also provides advantages to the internodal communication process since more CPU cycles are available for that aspect of system operation.

3 Claims, 4 Drawing Sheets

U.S. PATENT DOCUMENTS 6,230,151 B1   5/2001  Agrawal et al.
6,601,146 B2 *  7/2003  Auslander et al. .......... 711/147
6,647,423 B2 *  11/2003  Regnier et al. ............. 709/229

* cited by examiner

MEMORY SHARING IN A DISTRIBUTED DATA PROCESSING SYSTEM USING MODIFIED ADDRESS SPACE TO CREATE EXTENDED ADDRESS SPACE FOR COPYING DATA

BACKGROUND OF THE INVENTION

The present invention is generally directed to memory sharing in distributed data processing systems including a plurality of processing nodes. More particularly the present invention is directed to the improvement of intra-nodal communications in a manner which avoids unnecessary data copying and which also provides address space extension, when and where needed, in a manner which is transparent to users in both 32 bit environments (where there are typically a very small number of segments available to users) and in 64 bit environments.

For parallel applications executing on a distributed memory machine like the RS/6000 SP (IBM pSeries machines), tasks running as part of a parallel or distributed application communicate using some form of reliable message transport such as the publicly defined Message Passing Interface (MPI) or the Low Level Application Programming Interface (LAPI). The tasks of an application can be distributed across various nodes (where a node is defined as a single operating system image) of the system. However, in certain cases some or all of the tasks may reside on the same node. The placement of the tasks of a parallel application is usually abstracted from (that is, specified through) the application communication transport interface (for e.g. on the IBM SP systems this is accomplished via the LL (Loadleveler) and POE (Parallel Operating Environment) products). The underlying reliable message transport (like LAPI or MPI) detects whether or not the task to which communication is requested is running on the same node, in which case it switches to an internal, shared memory transport modality called intra-node communications. In the case of LAPI, the original task (or the task initiating the communication operation) and the target task (the task which is the target of a communication issued by the origin task) are either on the same node or on a different node; in the latter case, messages are sent across the network. This is referred to as inter-node communication. This mechanism improves overall system performance in two fundamental ways: (1) it increases inter-node communication performance since network congestion related to intra-node communications is reduced; and (2) it increases intra-node communication performance by avoiding having to stage data through the network and it takes advantage of operating system hooks to avoid having to stage data incurring extra copies of the data. The present invention provides a mechanism for improving intra-node communications, particularly as implemented in the LAPI (but not limited to LAPI) environment (an efficient one-sided programming model) within the intra-node environment (which is a shared memory environment) The basic concepts of LAPI for inter-node communication are described more particularly in U.S. Pat. No. 6,038,604 and in U.S. Pat. No. 6,035,335.

SUMMARY OF THE INVENTION

In accordance with one embodiment of the present invention a method for sharing data between tasks in a distributed data processing system is provided. In a first step of this method, a first task acquires control information from the data processing system. This control information relates to data contained within an address space of the first task This control information is then transferred to an area of memory shared by the first task and a second task. This control information is then transferred from the area of memory shared by these tasks to the second task which has its own address space. The address space of the second task is then extended, based on the transferred control information, so as to associate it with the data in the first task's address space. The data from the address space of the first task is then copied to the address space of the second task.

Accordingly, it is an object of the present invention to improve both inter-node and intra-node communications in distributed data processing systems.

It is a still further object of the present invention to reduce the amount of data copying in distributed data processing systems.

It is also an object of the present invention to improve the sharing of data between different tasks running on the same node.

It is yet another object of the present invention to increase the efficiency of transferring large messages.

It is a still further object of the present invention to integrate the transfer of internodal and intranodal messages.

It is also an object of the present invention to provide an efficient communication and notification system between tasks.

It is yet another object of the present invention to provide a hybrid data sharing system in the context of the present environment which enables the efficient transfer and/or sharing of both long and short messages or data.

It is a further object of the present invention to provide a system for message and/or data transfer and/or sharing in which there is provided a tunable transition point for method selection which depends on the size of the data or message.

Lastly, but not limited hereto, it is an object of the present invention to provide a practical interface between tasks for carrying out the other objects described above.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
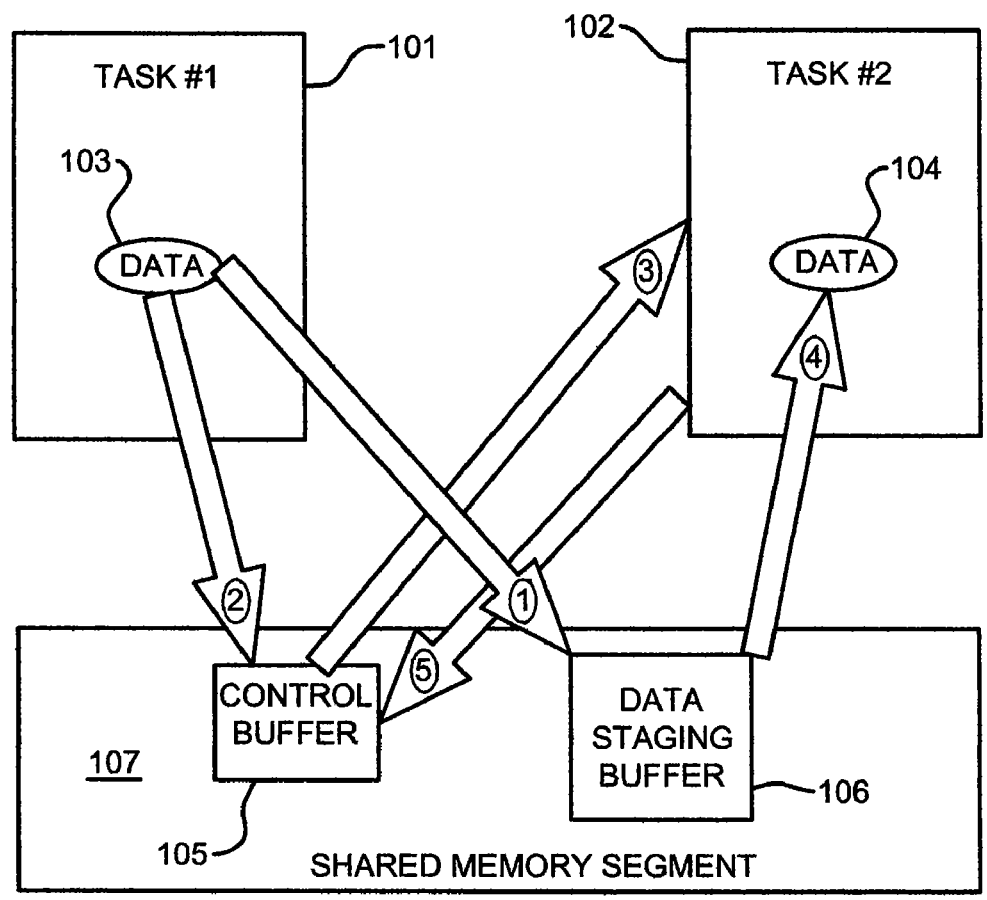
FIG. 1 is schematic diagram illustrating the conventional solution to the problem solved by the present invention.

The following features, as implemented in the LAPI shared memory transport environment, are provided by the present invention. It is noted that while these concepts are implemented in the LAPI transport protocol on the RS/6000 SP pSeries machine, these concepts are applicable in any shared memory transport system. A more detailed description for each of the features listed below is provided later on in the discussion:

- providing a mechanism in which a system call interface (through an operating system kernel extension) allows the ability of cooperating tasks (tasks of the same application), to register portions of their address space (as encapsulated in a memory handle) to be exposed to other cooperating tasks;
- providing a mechanism in which a system call interface (through an operating system kernel extension) allows the ability of cooperating tasks (tasks of the same application) to attach registered portions of the address space of tasks to their own address space;
- using the aforementioned attachment mechanism to minimize the creation of in-memory copies (especially for large messages where the overhead of message copies dominates the message transport overhead);
- providing an efficient protocol for messages that span multiple segment boundaries to ensure that in an address space specified by 32 bit addresses, the use of shared segments is accomplished judiciously in a segment by segment fashion so as to allow applications using a large virtual addressing space continue to operate;
- providing an efficient handshaking mechanism to allow the cooperating tasks that are communicating through shared memory to exchange information with respect to registered portions of memory (via the aforementioned memory handles) with notifications of completion and with requests for communication;
- providing tunable transition points based on message size to ensure that the cost of the setup for registration, handshaking operations, etc. are considered in tuning the communication transport for different underlying hardware (for example, adapters and switches) which serve as internal protocol decision points;
- efficiently integrating intra-node communication transport protocols with inter-node communication protocols. (Examples of these are important in collective calls such as "LAPI_Gfence" and "LAPI_Address_init.");
- providing an efficient notification mechanism among tasks during intra-node communications with respect to the completion of communication operations; and
- providing the data processing system with the property that, if all tasks of a parallel application are on the same node, then the transport protocol does not consume any network resources but instead uses the shared memory transport of the present invention for all relevant communications.

It is noted that in the pSeries of machines manufactured and offered for sale by the assignee of the present invention, that the definition of what constitutes a node sometimes takes on two different meanings. Originally, nodes of the predecessor systems of the pSeries machines included only a single processor. Newer models have included multiple processors. Operating system software exists which uses all of the multiple processors in a physical node. In such cases there is no distinction between the usual reference to a node and a physical node. However, it is also possible to have different operating systems (or multiple copies of the same operating system) present and running on each of the processors in a physical machine (also referred to as a CEC (computer electronic complex). In such cases, each of these operating system images is also referred to as a node. As used in the present description, the term node is meant to encompass both of these concepts.

Previous Standard Solutions

Before considering the present invention in detail, it is worth considering previous solutions to the problems described above. Such a discussion also has the advantage of more particularly illustrating the context and environment in which the present invention is deployed. The standard solution that most message passing systems (like MPI) implement is to allocate a shared memory segment on each node of the OS (Operating System) where there are multiple tasks of the same application executing. Each task of a parallel application executing on a node attaches the shared memory segment to its address space. The data structures in the shared memory segment are used to stage data transfers and to control information flow between tasks of a parallel application on the same node. Although this is a simple (does not require a kernel extension) and by far the most common solution, it suffers from some basic inefficiencies especially for large messages where the sending side copies data from its buffers to the shared memory segment, tells the target that the data is there, after which the receiving side copies the data (for the second time) from the shared memory segment to its own message buffers. This results in the data transfer being staged through two copies and is thus inefficient in terms of the time taken for the data transfer; inefficient in the utilization of CPU (Central Processing Unit) cycles (since the CPU has to move the data), thus further taking away valuable CPU cycles from the application (and thus ultimately from other applications as well). This problem is more severe and further exacerbated in concurrent systems since CPU cycle demand and CPU's access to the memory via the memory bus, are both stressed during the copy process resulting in poor performance.

To more clearly illustrate prior solutions and the environment in which the present invention is employed, attention is directed to the schematic block diagram shown in FIG. 1 which depicts the steps involved in at least one other approach to the problems posed. Task #1 and Task #2 are assumed to be part of a single parallel application executing on the same node of a data processing system. Block 101 and block 102 represent the address space of user space Task #1 and Task #2, respectively. Block 107 represents a shared memory segment within the common node that Task #1 and Task #2 attach to their address spaces and which they use to communicate with each other. There is also provided control data structure (Control Buffer 105) and a data exchange structure (Data Staging Buffer 106) in shared memory segment 107. In this example, Task #1 seeks to transfer the contents of data buffer 103 in address space 101 to buffer area 104 in address space 102 of Task #2. This transfer is accomplished in the following manner: Task #1 copies data from data buffer area 103 into a particular slot in shared memory segment 107 (step 1, as indicated on the arrow). Task #1 then writes a command (Step 2) on control data structure 105 indicating, among other things, the particular slot in which the data was placed in data exchange structure (Data Staging Buffer) 106. Task #2, through either a signaling or a polling mechanism, reads the command from Control Buffer 105 (Step 3) and then copies the data from Staging Buffer 106 into address space 102 (Step 4). Task #2 then writes a command in Control Buffer 105 to let Task #1 know that the data transfer is complete and that the buffer slots in the control and data buffers in the shared memory segment can be reused (Step 5). It should be noted that data exchange buffer 106 in shared memory segment 107 is limited and hence, if the data messages to be transferred or shared are larger than the available slot, then the data transfer is carried out in a staged fashion, as appropriate. This flow control is managed by the same protocol which effects the data transfer.

The mechanism in the process described above results in the production of two copies of the same data (the copy from source buffer 103 to buffer 106 in shared memory segment 107 and the copy from buffer 106 in shared memory segment 107 to target buffer 104). This is a major drawback of this method for providing intra-node shared memory transport, especially for large messages since the overhead of making multiple copies is directly proportional to the size of the message being copied for transport.

The Present Invention

Figure 2:
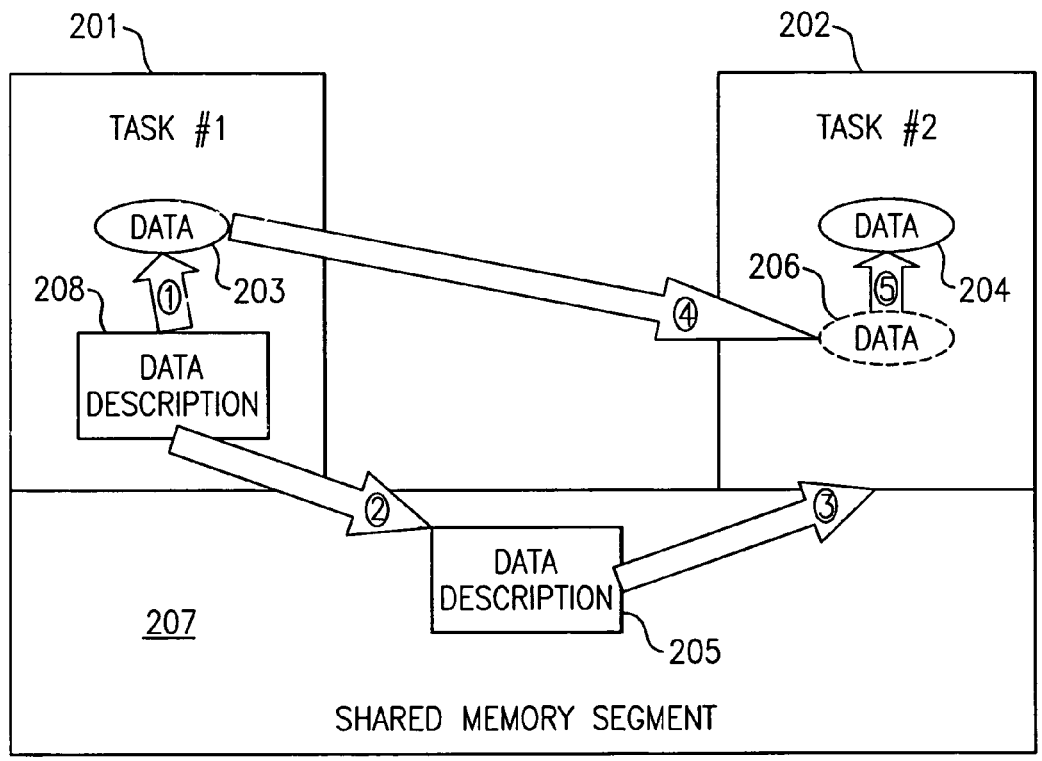
FIG. 2 is a schematic block diagram illustrating the method of the present invention.

FIG. 2 illustrates a process in accordance with a preferred embodiment of the present invention (as implemented in a LAPI environment) which provides more efficient intranodal shared memory operations, especially for the transport of large messages. The basic situation as presented in FIG. 1 is still present in FIG. 2: Task #1 and Task #2 are running in their own address spaces, 201 and 202, respectively, on a single node; data 203 is present within the address space of Task #1 and it is to be shared with and/or be transported to Task #2 running in address space 202. Data 203 may be present in the form of a buffer area or in the form of any other well defined location within address space 201. Task #1 "wishes" to send data 203 in address space 201 to Task #2 in address space 202. It does not necessarily know where, within address space 202 of Task #2, that this data needs to be transported; this may, however, be known to Task #1. Task #1 registers (step 1) data portion 203 within address space 201 that it seeks to send to Task #2 with the operating system kernel via a system call such as "_css_shmem_register" that is provided by the LAPI subsystem as a kernel extension. It is noted here that a naming convention is employed in which the initial underscore in the name of the system call merely indicates that this is an internal function, not available to, nor needed by, end users. This system call produces a memory handle (that is, an object through which other tasks in the system can refer to the registered portion of the memory) which is returned to the registering address space. This memory handle along with description 208 of the registered memory is then communicated (step 2) to cooperating Task #2 of the parallel application through control data structures (205) in shared memory segment 207. This handshake mechanism also results in Task #2 getting an asynchronous notification that Task #1 would like to communicate with Task #2. Task #2 then reads the information (step 3) in control structure (205) that was inserted by Task #1. Task #2 then parses the request from Task #1, and detects that Task #1 "wants to" send a large chunk or chunks of data from address space 201 of Task #1 to address space 202 of Task #2. In Step 4, Task #2 attaches the registered memory regions of Task #1 onto its own address space (202). The attach simply allows the process to treat the attached region of memory as part of its own address space. This is accomplished by another system call that is provided by LAPI via a kernel extension (_css_shmem_attach). The result of the actions above is that the registered portions of the memory of Task #1 are can now be directly addressed by Task #2 just as if those memory regions belong to Task #2. In Step 5, Task #2 now copies data from the registered and attached portions of the memory in address space 201 to their target destination buffers in address space 202 of Task #2. In a desired, but strictly speaking optional step (not shown in FIG. 2), Task #2 detaches the attached memory region of Task #1 (through another system call provided by LAPI) and notifies Task #1, through control data structure 205 in shared memory segment 207, that it is done effecting the data transfer and that the registered memory region can now be unregistered.

The advantage of this method is that there is only one data copy that is required to effect the data transfer. This results in high performance gains especially for large messages. However there is some overhead that results from the system calls. Hence for short messages it may be more efficient to use the approach in FIG. 1 (as long as the copy overhead is less than the system call overheads). The cut off point for the message size for which the switch between the protocol in FIG. 1 and FIG. 2 depends on the underlying hardware and Operating System characteristics. It is therefore designed to be tunable. The switch in the protocol is internal and the application writer using LAPI is completely oblivious of this switch.

There are several other aspects of the present invention whose details are now considered. The data that needs to be sent need not be contiguous and may span multiple memory segments. Hence a compact description of the data is created and communicated to the target side so that it can be easily parsed. An appropriate data description may, for example, follow the representation schemes set forth in U.S. patent application Ser. No. 09/517,167 filed on Mar. 2, 2000, which is hereby incorporated herein by reference. In data processing systems in which 32 bits are used for memory addresses, the number of memory segments available to the application is limited and is a critical resource. The methods of the present invention have the possibility of taking two additional segments away from the application (one segment for the shared memory control and data segment (207) and the attachable data segment (206)). If the data description runs into multiple segments, then the attach copy mechanism described in FIG. 2 could require that multiple segments be attached. In order to not take critical segment resources (especially in the 32 bit environment) away from the application, the present invention preferably employs a mechanism in which data transfer is accomplished through staging the data transfer one segment at a time. Note that this is an issue only for 32 bit applications. It may also be the case that there may not be any shared memory segment left for LAPI to use for the attach copy mechanism described in FIG. 2. In this case LAPI internally detects the lack of an additional segments and instead stages the transfer through the shared memory segment.

For some applications it is possible that the Resource Allocator (Loadleveler in the pSeries implementation) could launch all the tasks of a parallel application on the same node (that is, using the same Operating System image). In such situations, the tasks of the parallel application can communicate entirely using intra-node shared memory communications and hence need not require any network resources. In such cases the communication subsystem should not request any network resources. Accordingly, LAPI detects such resource allocations and assigns tasks to nodes so as to reduce and/or eliminate the unnecessary consumption of network resources.

It should be noted that the present invention does not require the maintenance of state information in contrast to the situation in network message passing which concerns itself with possibly lost packets and with the need to have saved necessary state information so as to be able to retransmit lost packets. The assumption in this case is that the shared memory transport never results in any lost data (that is, that the memory subsystem is reliable). However for applications where some tasks are on the same node while others are on a different node, then there is a mixture of intra-node and inter-node communication. Therefore the present invention provides a protocol for handshaking between the two inter-node and intra-node data sharing/transport modes of operation. It also provides shared memory and message passing to ensure correct operation of collective calls (for example, the calls to "LAPI_Gfence" and to "LAPI_Address_init"). This is accomplished via the integration of the shared memory dispatcher with the message passing dispatcher (see U.S. Pat. Nos. 6,038,604 and 6,035,335).

System Call Interfaces

In order to carry out the processes of the present invention, system call interfaces have been defined to provide two important aspects of the process: (1) registering and releasing memory segments; and (2) attaching and detaching memory regions. In order to provide function calls for registering and releasing and for attaching and detaching memory regions, command type, data type and structures are defined as described below:

typedef int _css_mem_hndl_t;
enum _css_shmem_reg_cmd {
    CSS_SHMEM_REG, CSS_SHMEM_REL, CSS_SHMEM_REG_REL
};
enum _css_shmem_att_cmd {
    CSS_SHMEM_ATT, CSS_SHMEM_DET, CSS_SHMEM_ATT_DET
};
typedef struct _css_shmem_reg_info {
    int command;
    _css_mem_hndl_t hndl_in;
    _css_mem_hndl_t hndl_out;
    unsigned int pid_partner;
    long long pointer;
    long long len;
} _css_shmem_reg_info_t;

Command—input, one of commands defined in css_shmem_reg_cmd.
Hndl_in—input, shared memory handle returned from previous register.
Hndl_out—output, shared memory handle returned after registering memory segment.
Pid_partner—input, pid of the process which may attach to this memory region.
Ppinter—input, pointer to the exported data memory region.
Len—input, length of that data memory region.
typedef struct _css_shmem_att_info {
    int command;
    _css_mem_hndl_t hndl_att;
    _css_mem_hndl_t hndl_det;
    int pad;
    long long req_ptr;
    long long offset;
    long long pointer;
    int len_avail;
    int att_offset;
} _css_shmem_att_info_t;

Command—input, one of commands defined in _css_shmem_att_cmd.
Hndl_att—input, memory handle for attach, returned from previous register.
Hndl_det—input, memory handle for detach.
Pad—pad field.
Req_ptr—input, requested memory pointer in the partner's space
Offset—input, offset from req_ptr to attach to.
Pointer—output, pointer to attached region in local address space.
Len_avail—output, amount of memory addressable from the attached memory region.
Att_offset—output, offset from attached memory region where data is located.

The Interface semantics for those functions are described below in detail.

_css_shmem_register System Call
Purpose
    Register and/or release a virtual memory region.
    int _css_shmem_register(_css_shmem_reg_info_t ptr_inout)
Parameters
    ptr_inout IN/OUT. The pointer to structure of _css_shmem_reg_info_t as described above.
Description
    The function "_css_shmem_register" is provided to register and/or release a memory segment which is attachable by another process. A pointer to structure _css_shmem_reg_info_t is the input argument. If the command is CSS_SHMEM_REG or CSS_SHMEM_REG_REL, hndl_out is returned in structure _css_shmem_reg_info_t which is used by _css_shmem_attach. If the command is CSS_SHMEM_REL or CSS_SHMEM_REG_REL, the registed memory region associated with hndl_in is released. It is noted here that the notation above follows C programming language conventions in which constants are defined with all letters capitalized.
Return Values:
_css_shmem_attach System Call
Purpose
    Attach or detach a portion of memory region previously registered by another process.
    int _css_shmem_attach(_css_shmem_att_info_t ptr_inout)
Parameters
    ptr_inout IN/OUT The pointer to structure of _css_shmem_att_info_t as described above.
Description
    The function "_css_shmem_attach" is provided to attach or detach a portion of memory previously registered by another process. The input parameter is a pointer to _css_shmem_att_info_t structure which stores all information of a memory portion to be attached or detached. If the command is CSS_SHMEM_ATT or CSS_SHMEM_ATT_DET, the memory, a portion of registered memory associated with hndl_att is attached to the current address space. If the command is CSS_SHMEM_DET or CSS_SHMEM_ATT_DET, the segment associated with hndl_det is detached. The parameters handle_att and handle_det can be the same if, for example, the caller wishes to reference a different portion of a registered memory region. The Attach and/or detach operation fails if the referenced handle is not valid or if the memory handle was not registered for use by this process.

Performance Data

Figure 3:
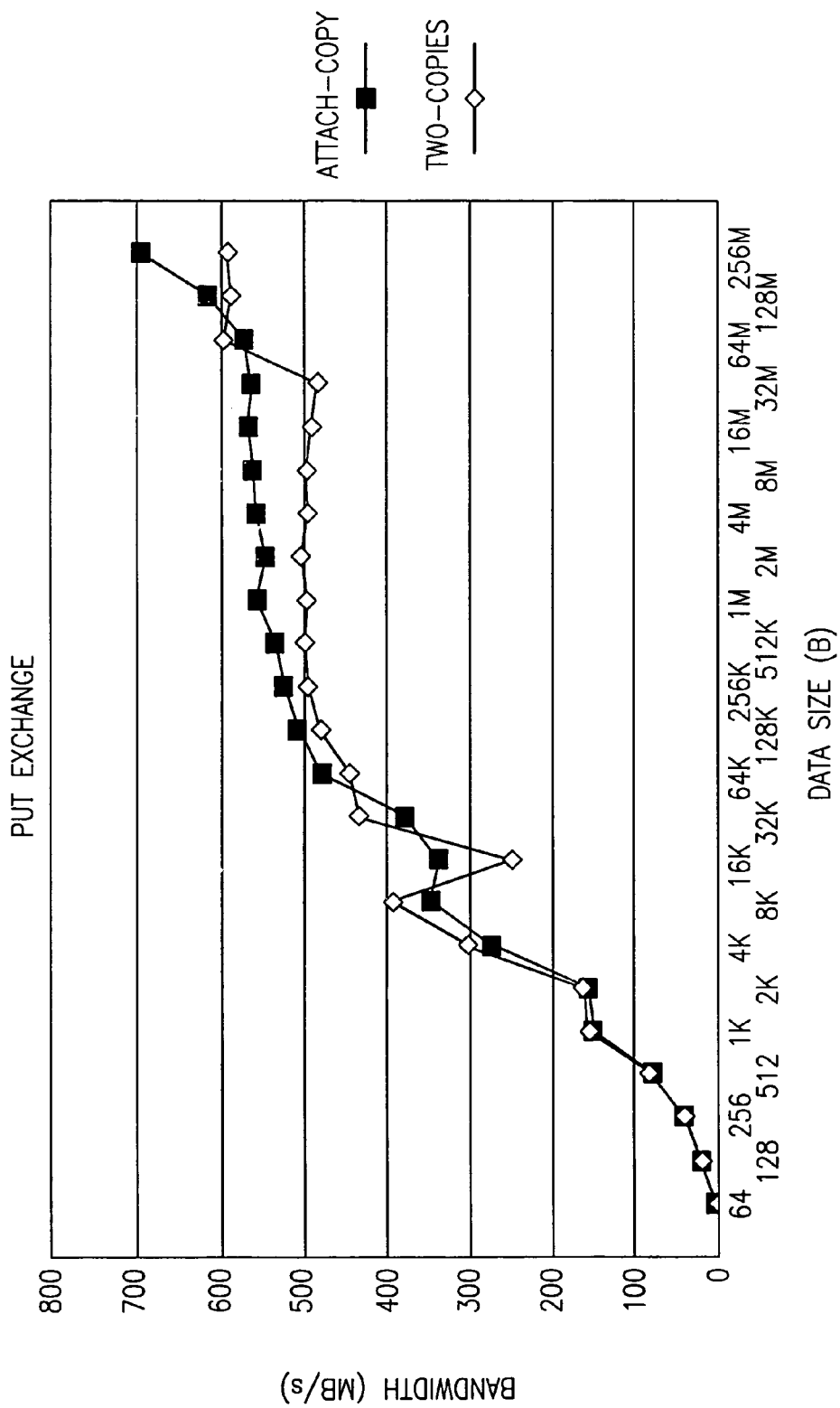
FIG. 3 is a plot illustrating improvements in efficiency provided by use of the present invention in a put exchange operation.
Figure 4:
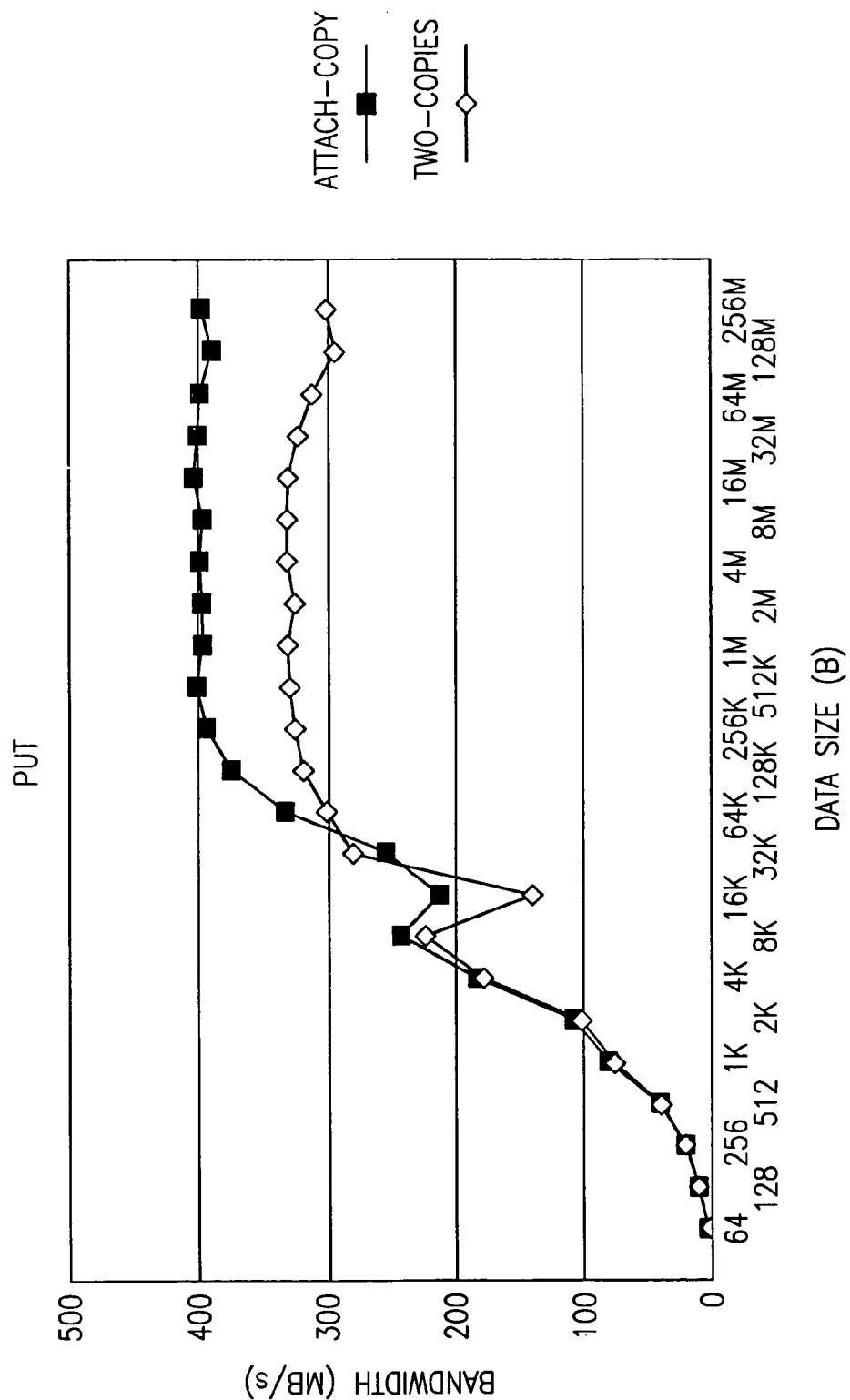
FIG. 4 is a plot illustrating improvements in efficiency provided by use of the present invention in a put operation.

The improvement in bandwidth provided by the process of the present invention is illustrated in FIGS. 3 and 4. Each of these is a plot of bandwidth versus the size of the data that is to be shared and/or transported. Each data point represents the average of ten runs. The process of the present invention (attach-copy), in both Figures is depicted using square data points; the performance of the data points represented by circles depicts the prior art approach (two-copies) shown in FIG. 1 in which two copies of the data are used. FIG. 3 illustrates a performance data comparison for a "put exchange" operation. FIG. 4 illustrates the same comparison for a "put" operation. In both FIG. 3 and in FIG. 4, it is seen that the process of the present invention almost always provides greater bandwidth (that is, a greater data transfer rate). In those situations in which the size of the data chunk to be transported or shared is such that the prior art process would be advantageous, it is generally desirable to use it. Accordingly, since data size is a known parameter, the present invention also contemplates a process in which data size is determined and used to select between transfer/sharing processes.

In the "Put Exchange" case shown in FIG. 3, both tasks send data to each other using the LAPI_Put( ) operation at the same time and then they wait for the send operations to complete for both tasks. In this case, both tasks are busy copying data regardless of which copying protocol (either attach-copy or two-copies) is used.

In the "Put" case shown in FIG. 4, Task #1 sends data to Task #2 using the LAPI_Put( ) operation (one of the message passing calls provided by LAPI) and Task #2 waits for the send operation to complete. When the attach-copy process is employed, only Task #2 copies data, that is, from the attached segment to a receive buffer. When the standard solution (two copies) is employed, both tasks copy data: one copies data into shared memory and the other task copies data out of shared memory.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for sharing data between tasks in a distributed data processing system, said method comprising:
   acquiring, by a first task, from said data processing system, control information including a memory handle to be used by a second task in accessing data contained within an address space of said first task;
   transferring said control information to an area of memory shared by said first task and said second task;
   transferring said control information from said shared memory area to said second task which has its own address space, wherein said address space of said first task is accessible employing, in part, said control information;
   modifying an address space of said second task, based on said control information, by allowing said second task access to said address space of said first task, so as to allow said second task access to said data in said first task's address space, said modifying creating an extended address space of said second task; and
   copying, employing a single copy operation, said data from the extended address space of said second task, associated with said data in said first task's address space, to a destination address space of said second task.

2. The method of claim 1 further including:
   determining the size of said data; and
   performing the method only when the size of the data exceeds a defined threshold.

3. The method of claim 1 further including:
   notifying said first task, through said control information in said shared memory area, that said second task is finished with data transfer and that the shared memory area is available.

* * * * *